(12) United States Patent
Kirby

(10) Patent No.: US 10,017,933 B1
(45) Date of Patent: Jul. 10, 2018

(54) LINEAR DRAIN HAVING ADJUSTABLE LENGTH

(71) Applicant: Mark E. Kirby, Clearwater, FL (US)

(72) Inventor: Mark E. Kirby, Clearwater, FL (US)

(73) Assignee: Goof Proof Products, LLC, Clearwater, FL (US)

( * ) Notice: Subject to any disclaimer, the term of this patent is extended or adjusted under 35 U.S.C. 154(b) by 0 days.

(21) Appl. No.: 15/810,977

(22) Filed: Nov. 13, 2017

Related U.S. Application Data

(63) Continuation of application No. 15/051,760, filed on Feb. 24, 2016, which is a continuation of application No. 14/281,181, filed on May 19, 2014, now Pat. No. 9,334,638.

(51) Int. Cl.
*A47K 3/00* (2006.01)
*E03F 5/04* (2006.01)

(52) U.S. Cl.
CPC .... *E03F 5/0408* (2013.01); *E03F 2005/0413* (2013.01); *E03F 2005/0414* (2013.01)

(58) Field of Classification Search
CPC .................................................. E03F 5/0408
USPC ............................................................ 4/613
See application file for complete search history.

(56) References Cited

U.S. PATENT DOCUMENTS

| | | | |
|---|---|---|---|
| 7,862,729 B2 | 1/2011 | Stetson | |
| 9,334,638 B1 | 5/2016 | Kirby | |
| 2006/0239773 A1* | 10/2006 | Meyers | E01C 11/227 404/2 |
| 2011/0023978 A1* | 2/2011 | Keizers | E03F 5/0407 137/362 |
| 2011/0162137 A1* | 7/2011 | Kik, Sr. | E03F 3/046 4/613 |
| 2016/0130794 A1* | 5/2016 | Erlebach | E03F 5/0408 4/613 |

* cited by examiner

*Primary Examiner* — Huyen Le
(74) *Attorney, Agent, or Firm* — Nicholas Pfeifer; Smith & Hopen, P.A.

(57) ABSTRACT

An elongate linear drain for a shower includes an elongate, channel-shaped drain body, an elongate, channel-shaped extension that is connectable to either end of the drain body, elongate inserts that are nested within the drain body and the extension, and end walls that cap the ends of the drain body and the ends of the extension. Mounting members are formed along an outboard side of each sidewall of the drain body and the extensions and the mounting members are engaged by float sticks to facilitate the sloping of the floor that leads to the linear drain. Height adjustment screws formed in the respective bottom walls of the drain body and extensions enable height adjustment of the inserts. This enables the tile that overlies the shower floor to be flush with the tile that overlies the insert.

20 Claims, 8 Drawing Sheets

LINEAR DRAIN HAVING ADJUSTABLE LENGTH

CROSS-REFERENCE TO RELATED APPLICATIONS

This nonprovisional application is a continuation of and claims priority to nonprovisional application Ser. No. 15/051,760, entitled "LINEAR DRAIN HAVING ADJUSTABLE LENGTH," filed Feb. 24, 2016 by the same inventor, which is a continuation of and claims priority to nonprovisional application Ser. No. 14/281,181, entitled "LINEAR DRAIN HAVING ADJUSTABLE LENGTH," filed May 19, 2014, and patented on May 10, 2016 as U.S. Pat. No. 9,334,638, by the same inventor.

BACKGROUND OF THE INVENTION

1. Field of the Invention

This invention relates to the art of construction. More specifically, it relates to elongate drains for shower installations.

2. Brief Description of the Related Art

The drain of a shower is most often positioned in the center of a shower floor and the floor is sloped in all directions to direct water to the drain.

It is sometimes advantageous, however, to provide an elongate drain that extends the entire width or length of a shower stall. If such a drain is positioned along a center line of the shower, only two downwardly inclined slopes are needed, i.e., one on each side of the drain. If such a drain is positioned on a border of the shower, only one slope leading to the drain is needed. The drain itself has a central opening and the bottom wall of the drain is sloped toward such opening.

U.S. Pat. No. 6,155,015 to the present inventor, entitled Method for Making a Sloped Floor, discloses commercially successful float sticks that facilitate the sloping of a shower floor to a central drain and said patent is hereby incorporated by reference into this disclosure. Although the patented float sticks have been widely adopted by the industry, the conventional wisdom is that they have utility in central drain installations because the patent depicts the float sticks positioned in radiating relation to a central drain.

Accordingly, no elongate linear drain has been disclosed by third parties that could be installed with the aid of the patented float sticks. Installers of such elongate linear drains have thus resorted to conventional, more time-consuming and less reliable techniques for their installation.

Conventional linear drains are of monolithic, metallic construction. Linear drains of differing lengths must therefore be maintained in inventory so that the correct size will be available for use.

Thus, there is a need for a linear drain formed of a non-metallic material that can be provided in modular parts that can be connected together so that an installer can quickly assemble a drain of any standard length.

In view of the art considered as a whole at the time the present invention was made, it was not obvious to those of ordinary skill in the field of this invention that the conventional method of installing elongate linear drains could be improved and therefore it was not obvious that the patented float sticks could be used in conjunction with such elongate linear drains nor was it obvious that such linear drains could be formed of non-metallic materials in modular, connectable units.

BRIEF SUMMARY OF THE INVENTION

The long-standing but heretofore unfulfilled need for an improved elongate linear drain is now met by a new, useful, and nonobvious invention.

The novel linear drain for a shower floor includes a bottom wall having any predetermined geometrical configuration suitable for use as a linear drain but which is preferably of flat, rectangular construction. A drain-receiving aperture is formed in the bottom wall and upstanding side walls having a common height are mounted along longitudinally extending edges of the bottom wall. The side walls define the depth of the linear drain.

The novel structure has four (4) parts: 1) The elongate, open-ended channel-shaped drain base having a central drain opening; 2) A plurality of channel-shaped drain extension members that may be secured to either end of the drain base to effectively lengthen it; 3) A plurality of inserts that nest within the channel defined by the drain base and its extension members, if any; and 4) a pair of end caps that close the opposite ends of the drain base if no extension members are used and which close the opposite ends of any drain base and extension assembly.

In the preferred embodiment, the flat bottom wall of the drain base is adapted to overlie a recessed level support surface at the lowermost end of a slope formed by the floor of a shower. Transversely spaced apart parallel side walls are mounted to the opposed longitudinally extending edges of the bottom wall in vertical, upstanding relation thereto as aforesaid.

The end of each sidewall has a vertically extending concavity formed in its opposite ends to enable the attachment of an extension member or an end wall thereto. The concavity extends the entire vertical extent of the sidewall within which it is formed.

Each extension member has a structure similar to that of the drain base except that the bottom wall of each extension has no drain opening formed therein. The bottom wall of each extension member has the same width and thickness as the bottom wall of the drain body and each sidewall of each extension member shares the same size and structure as the side walls of the drain body. Accordingly, when a drain body and an extension member are secured to one another in end-to-end relation, they effectively form a single piece having a uniform transverse cross-sectional shape.

A large plurality of vertically disposed, longitudinally and equidistantly spaced apart mounting members are formed integrally with each side wall of the drain base and the extension member on an outboard side thereof, extending from each sidewall of the drain base or extension member. These mounting members are engaged by respective leading ends of the float sticks. In a preferred embodiment, each mounting member forms a vertically extending concavity having a vertical extent substantially equal to the vertical extent of the side wall with which it is integrally formed.

Each mounting member is adapted to be engaged by a leading end of a float stick. A vertically extending protuberance is formed at the leading end of each float stick for releasable connection with the concavity formed by the mounting members.

In an alternative embodiment, the mounting members are independently formed and are clipped onto or otherwise attached to each sidewall in equidistantly spaced relation to one another.

In both mounting member embodiments, the mounting members preferably have a height substantially equal to a height of the sidewall with which they are integrally formed or to which they are attached. Each mounting member preferably includes a concavity configured to capture a leading end of a float stick as aforesaid but any mounting member that can capture the leading end of a float stick is within the scope of this invention.

Each insert has an elongate structure similar to that of the drain base or an extension member except that it is slightly narrower than such parts so that it can nest within them. Each insert has a flat bottom wall that overlies the flat bottom wall of a drain base or an extension member. Side walls that extend the length of the bottom wall are mounted to transversely spaced apart, longitudinally extending opposite edges of the bottom wall in parallel relation to one another and in vertical relation to the bottom wall.

A large plurality of vertically disposed, longitudinally and equidistantly spaced apart spacers are formed integrally with each side wall and end wall of the insert on an outboard side thereof, extending from each sidewall and end wall of the insert and abutting an adjacent side wall and end wall of the drain base or an extension. These spacers create a uniform space between the insert and the drain base or extension member so that water flowing downwardly toward the novel linear drain from the sloped shower floor may enter into the channel defined by the drain base or extension member without being blocked by the insert.

The upward-facing surface of the insert bottom wall is waffled to provide a good bonding surface for the cementitious material that overlies said insert bottom wall and which underlies the tile that covers the insert when the drain installation is complete.

Each end piece has an imperforate, transversely disposed imperforate end wall that includes a pair of transversely spaced apart, upstanding protuberances or lock members that are slidingly received within the concavities formed in the respective ends formed in the drain base and extension members.

The novel method of installing an elongate linear drain in a shower includes the steps of providing an elongate bottom wall, preferably of rectangular construction, forming a drain-receiving aperture in the bottom wall, mounting upstanding side walls having a common height along the longitudinal edges of the bottom wall, securing a first plurality of mounting members to a preselected first side wall, securing a second plurality of mounting members a preselected second side wall, and adapting each of the mounting members to engage a leading end of a float stick, thereby facilitating installation of an elongate linear drain in a shower.

The novel method also includes the step of forming the novel linear drain of a material such as acrylonitrile butadiene styrene (ABS) or any similar material that is light-in-weight, impact resistant, capable of being injection molded or extruded, and which is provided in various modular lengths that can be added to one another to fit showers of standard sizes.

The primary object of the invention is to advance the art of linear drains by providing a linear drain that includes float stick mounting members so that float sticks may be employed to facilitate installation of the linear drain.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
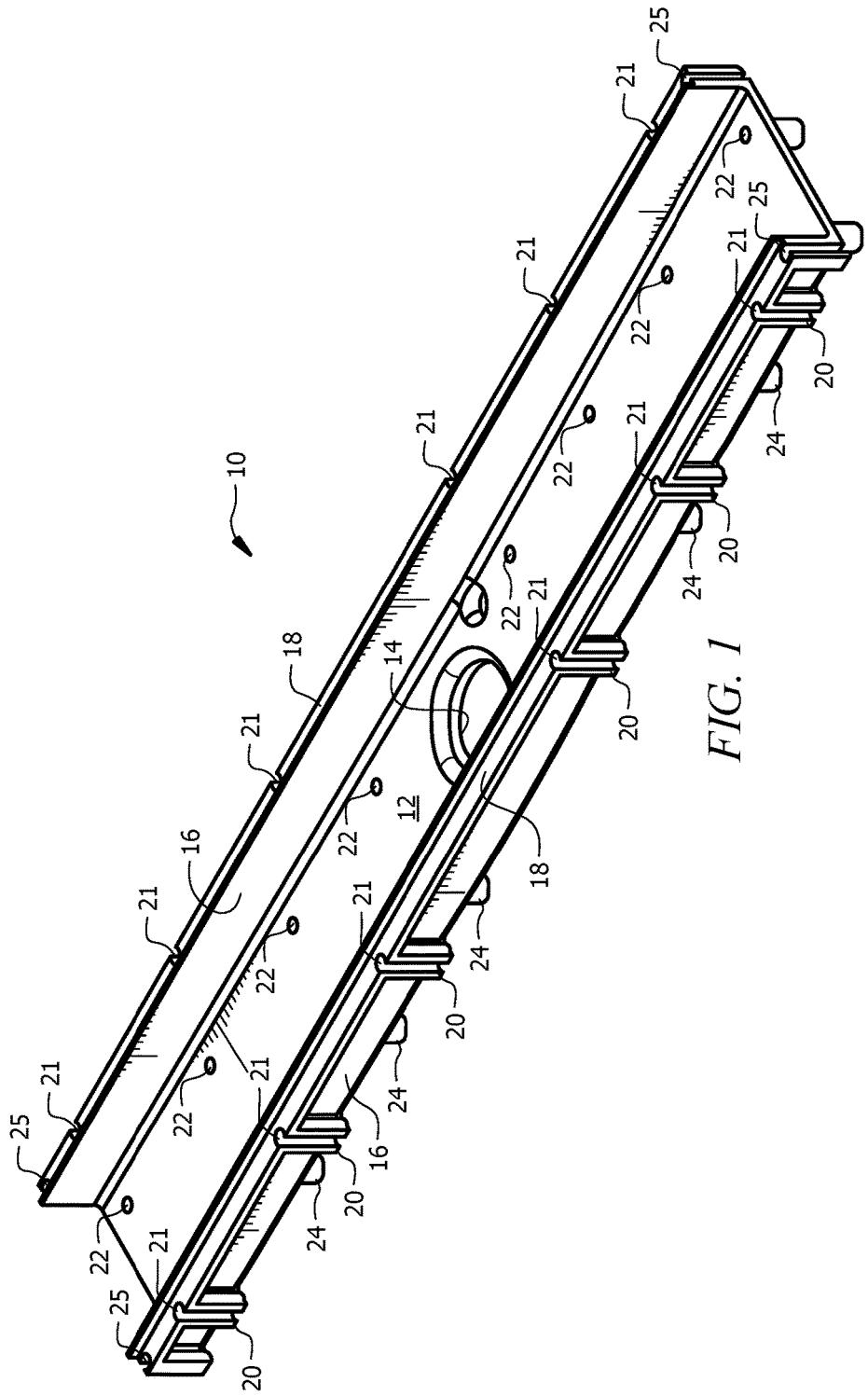
FIG. 1 is a perspective view of the novel drain body.

The novel structure is denoted as a whole in FIG. 1 by the reference numeral 10.

Elongate linear drain 10 preferably includes rectangular bottom wall 12 having drain aperture 14 formed therein. Drain aperture 14 is centered with respect to the length of linear drain 10 in this embodiment but there is no requirement that it be centered. Bottom wall 12 is sloped in all embodiments so that water is directed into said drain aperture 14. The location of drain aperture 14 is dictated by the environment in which novel structure 10 is used.

Two longitudinally extending upstanding side walls having a common height, collectively denoted 16, are mounted to the longitudinally extending edges of rectangular bottom wall 12 and collectively define the depth of linear drain 10. Horizontally extending flanges, collectively denoted 18, are connected to said upstanding side walls and extend therefrom in an outboard direction. Each flange 18 is spaced slightly downwardly from the top edge of each sidewall 16, 16 as depicted.

Mounting members, collectively denoted 20, are formed in side walls 16 and flanges 18, 18 along the extent thereof. The mounting members may be equidistantly spaced from one another or the spacings may be of variable distances. Each mounting member defines a bore or concavity 21 that receives a mating part or convex protuberance of a float stick of the type depicted in the incorporated patent.

A plurality of height adjustment screws is collectively denoted 22 in FIG. 1. Each screw is received within a bore formed in its associated boss 24 and each boss depends from bottom wall 12. The function of height adjustment screws 22 is disclosed hereinafter.

As depicted in FIG. 1, drain body 10 forms an open-ended channel. This enables an installer to attach a transversely disposed end wall, not depicted in FIG. 1, to each end of said drain body if, due to the dimensions of the shower, there is no need to extend the longitudinal extent of drain body 10. Openings or bores, collectively denoted 25, are formed in each end of each side wall 16 to accommodate mating protuberances formed in such end walls. In the preferred embodiment, the end wall protuberances are inserted into openings 25 from the bottom, i.e., each end wall is installed in an upward motion.

Figure 2:
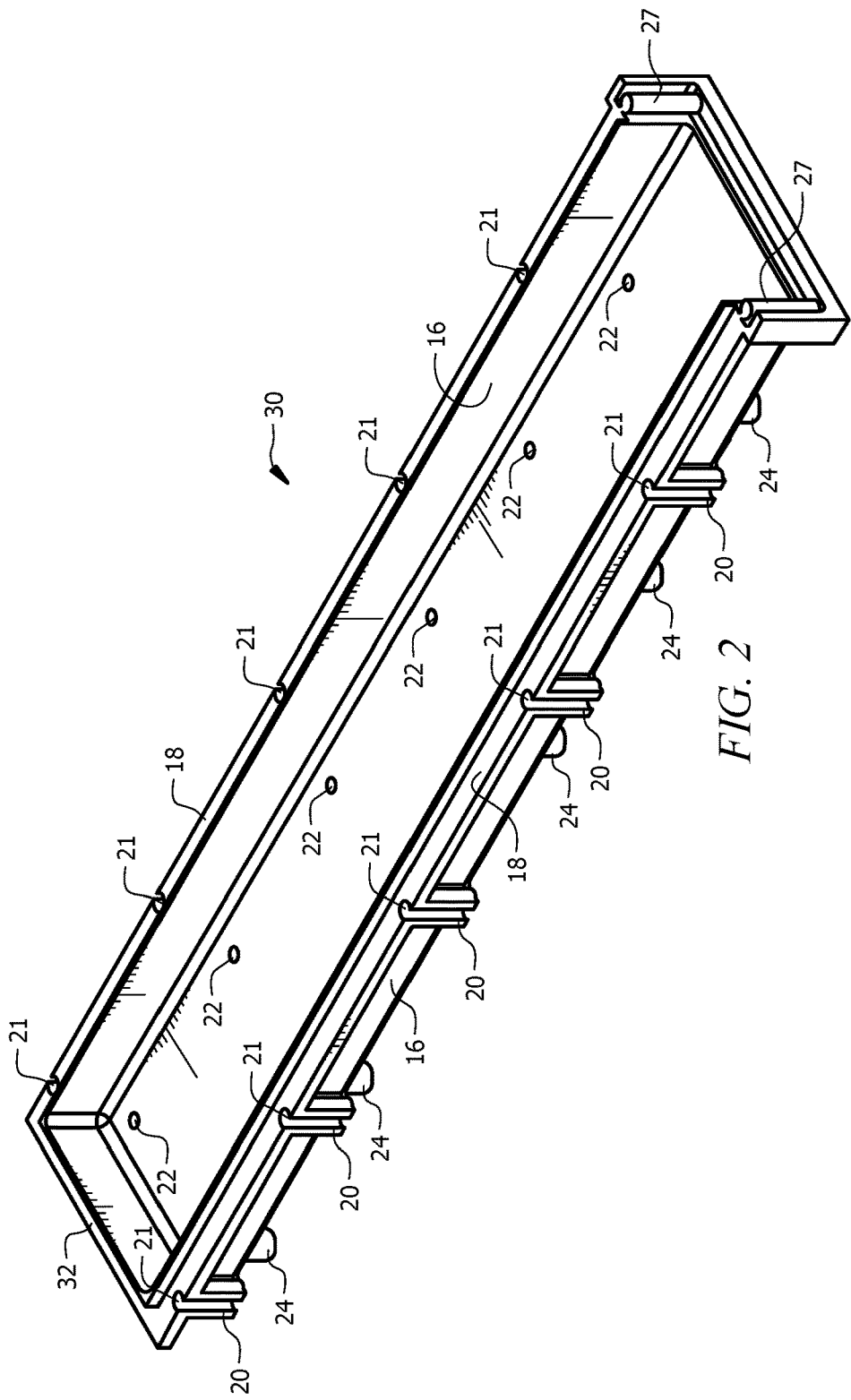
FIG. 2 is a perspective view of an extension member that is connectable to either end of the drain body or to an open end of another extension.

If there is a need to extend the length of drain body 10, at least one extension member 30 such as depicted in FIG. 2 may be used. If only one extension member 30 is needed, said extension member is secured to a preselected open end and the other end of drain body 10 is closed with an end wall. If two extension members 30 are required, one can be placed at each end of drain body 10 and an end wall is secured to each free end of the extension members. It should also be understood that two (2) extension members could be added to a first end of drain body 10 with an end wall closing the second end of said drain body 10 and an end wall closing the free end of the second extension member.

It is also within the scope of this invention to provide a drain body 10 having a first end closed with an integrally formed end wall so that an extension member may be attached to the open second end. It is further within the scope of this invention to provide a drain body 10 having its first and second ends closed with an integrally formed end wall so that no extension member may be attached to either end.

Extension member 30 has the same construction as drain body 10, with the exception that it does not include drain opening 14. Therefore, the reference numerals that identify the parts of drain body 10 in FIG. 1 are applied in FIG. 2 to the same parts. In this example, transversely disposed end wall 32 closes the free end of extension member 30 and the open end of extension member 30 includes upstanding protuberances 27, 27 that respectively engage openings 25, 25 formed in side walls 16, 16 of drain body 10. It is within the scope of this invention to provide an extension member end wall that is integrally formed with the extension member.

Figure 3:
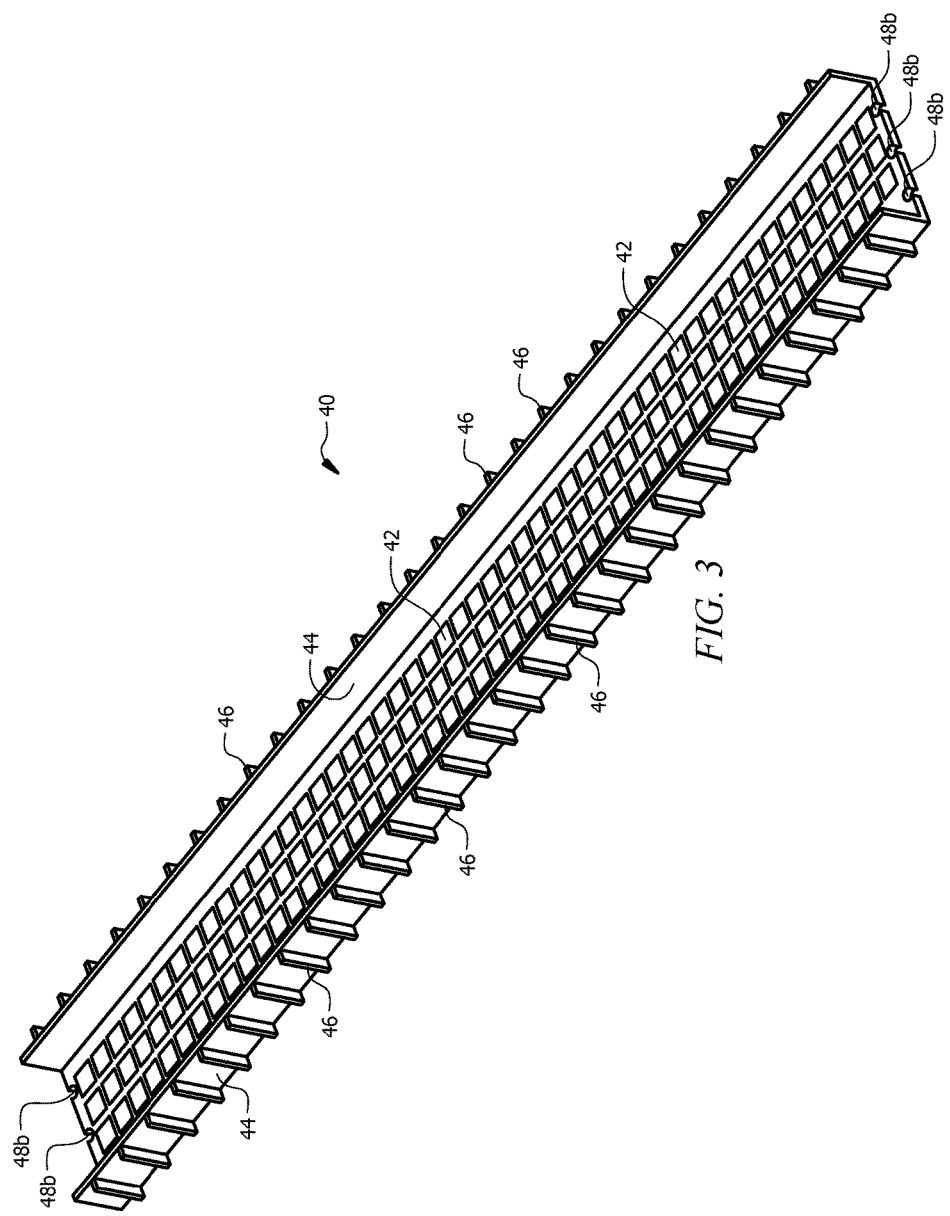
FIG. 3 is a perspective view of an insert that is nestable within the channel defined by the drain body or an extension member secured to the drain body.

Insert 40, depicted in FIG. 3, includes imperforate bottom wall 42, the upper surface of which has a waffle pattern formed therein as depicted to facilitate the tiling thereof, and upstanding sidewalls 44 mounted along the longitudinally extending edges of bottom wall 42 to form a channel. The un-numbered small squares creating the waffle pattern increase the traction between the insert and the concrete or mud upon which the tiles are laid. Openings 48b formed in the opposite ends of bottom wall 42 facilitate attachment of an end wall to each end of the insert if needed as more fully disclosed below in connection with FIG. 4B.

A large plurality of spacers, collectively denoted 46, are formed integrally with each side wall 44 and project therefrom at a ninety degree) (90°) angle, i.e., in an outboard direction. A much smaller number of spacers is also within the scope of this invention. The distance between side walls 16, 16 of drain body 10 and extension member 30 is greater than the distance between side walls 44, 44 of insert 40 by a predetermined amount and each spacer 46 has a transverse extent equal to about half of that predetermined amount so that each insert 40 fits into each channel defined by drain body 10 and extension member 30. Bottom wall 42 of each insert thus overlies bottom wall 12 of its associated drain body 10 or extension member 30 and sidewalls 16, 16 of drain body 10 and extension member or members 30 are in parallel, spaced apart relation to side walls 44, 44 of each insert 40. The longitudinally extending, parallel spaces created by spacers 46 enables water to enter into said parallel spaces, said water eventually entering drain opening 14.

Height adjustment screws 22 that screw-threadedly engage bosses 24 formed in the respective bottom walls of each drain body 10 and each extension member 30 enable height adjustment of each insert 40, i.e., screw advancement raises the insert and screw retraction lowers the insert. This enables the tile that overlies the shower floor to be flush with the tile that overlies each insert 40.

Figure 4A:
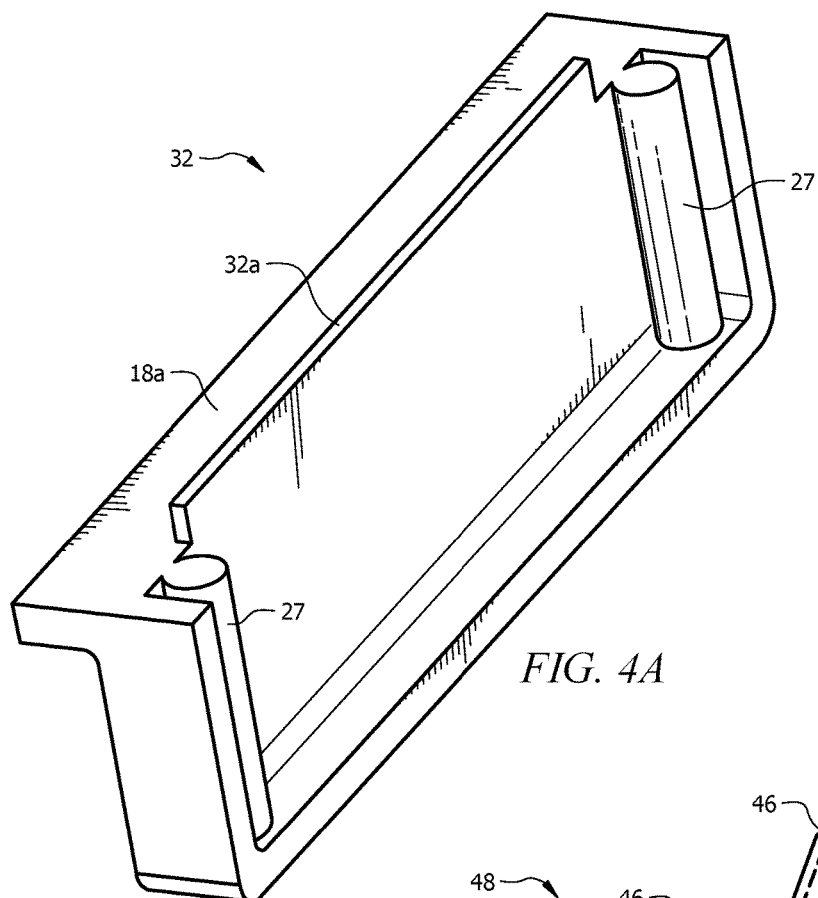
FIG. 4A is a perspective view of an end wall that caps either the opposite ends of a drain body or an end of an extension member.

FIG. 4A depicts a drain body or extension member end wall 32 in greater detail. Protuberances 27, 27 may engage openings 25, 25 at either end of drain body side walls 16, 16 or sidewalls 16, 16 of an extension member 30. Protuberances 27, 27 depicted in FIG. 2 have the same structure but are not part of an end wall 32; protuberances 27, 27 of FIG. 2 engages openings 25, 25 formed in drain body 10. Flange 18a of end wall 32 is spaced slightly downwardly from the top edge of transverse wall 32a so that it is flush with flange 18 of drain body 10 and extension member or members 30.

Figure 4B:
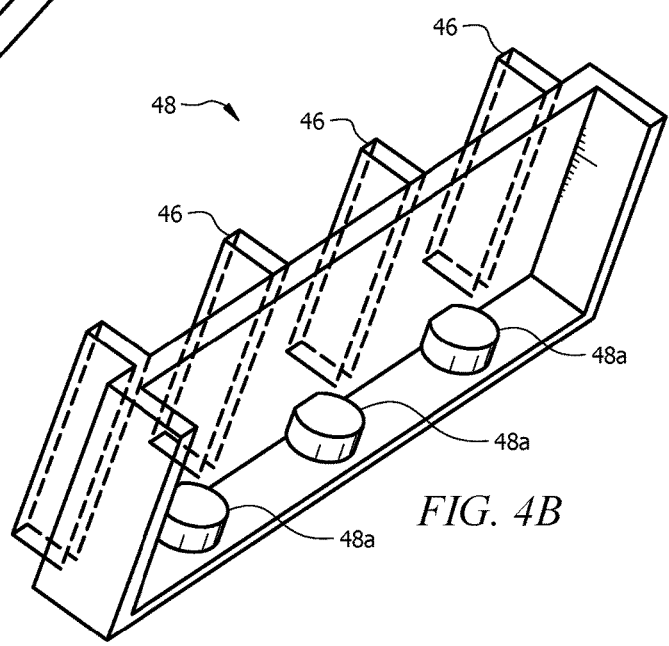
FIG. 4B is a perspective view of an end wall that caps the opposite ends of an insert.

FIG. 4B depicts an insert end wall 48. It is provided with spacers 46 for the same reason that said spacers are provided on sidewalls 44 of insert 40. Buttons 48a, depicted in FIG. 4B, engage openings 48b formed in the transverse edges of insert bottom wall 42 as depicted in FIG. 3.

Figure 5:
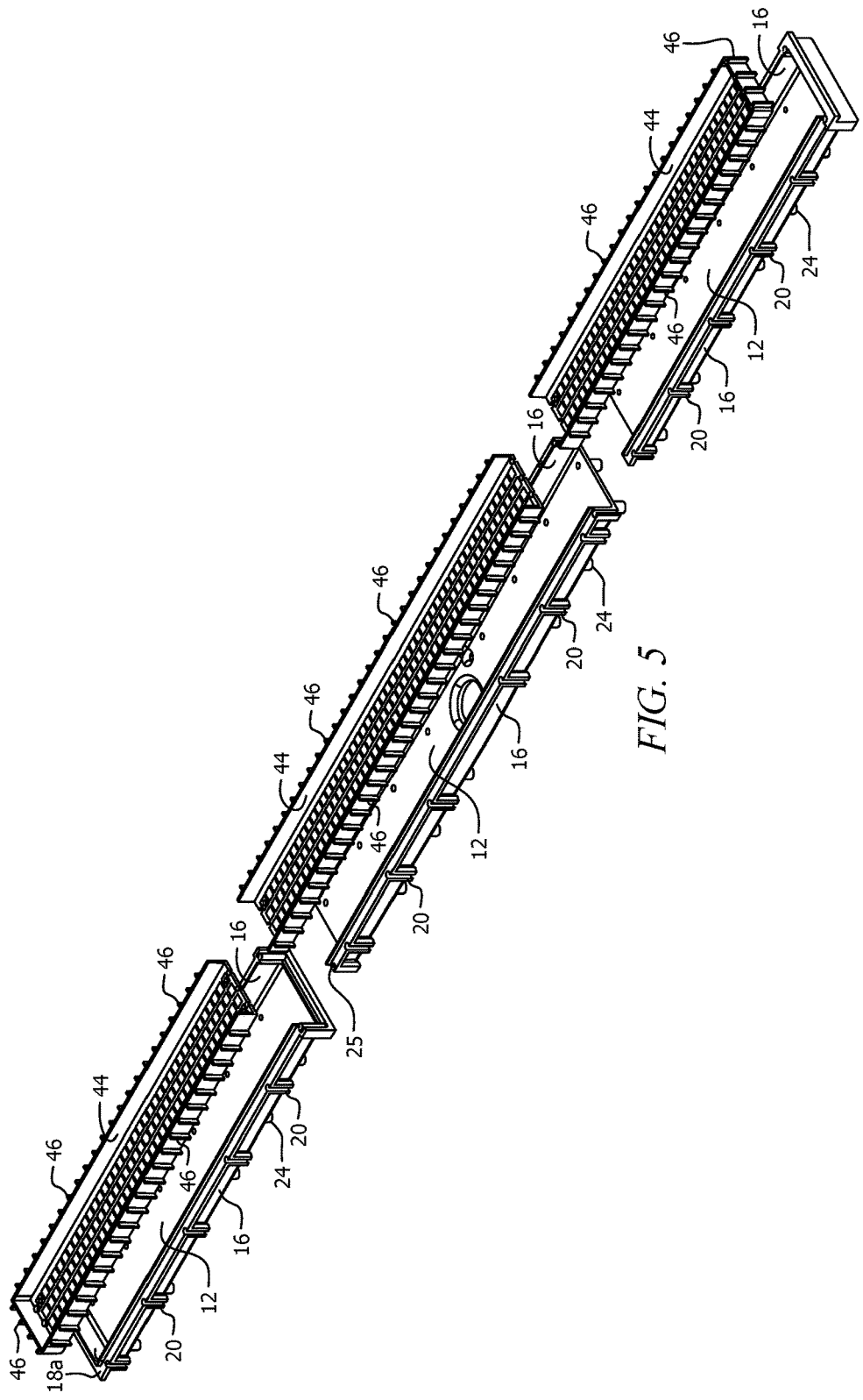
FIG. 5 is a partially exploded perspective view of a drain body having its effective length extended by two extension members.

FIG. 5 provides an exploded view where the longitudinal extent of drain body 10 is effectively extended by an extension member 30 at each end. All of the reference numerals appearing in FIG. 5 also appear in FIGS. 1-4.

Figure 6:
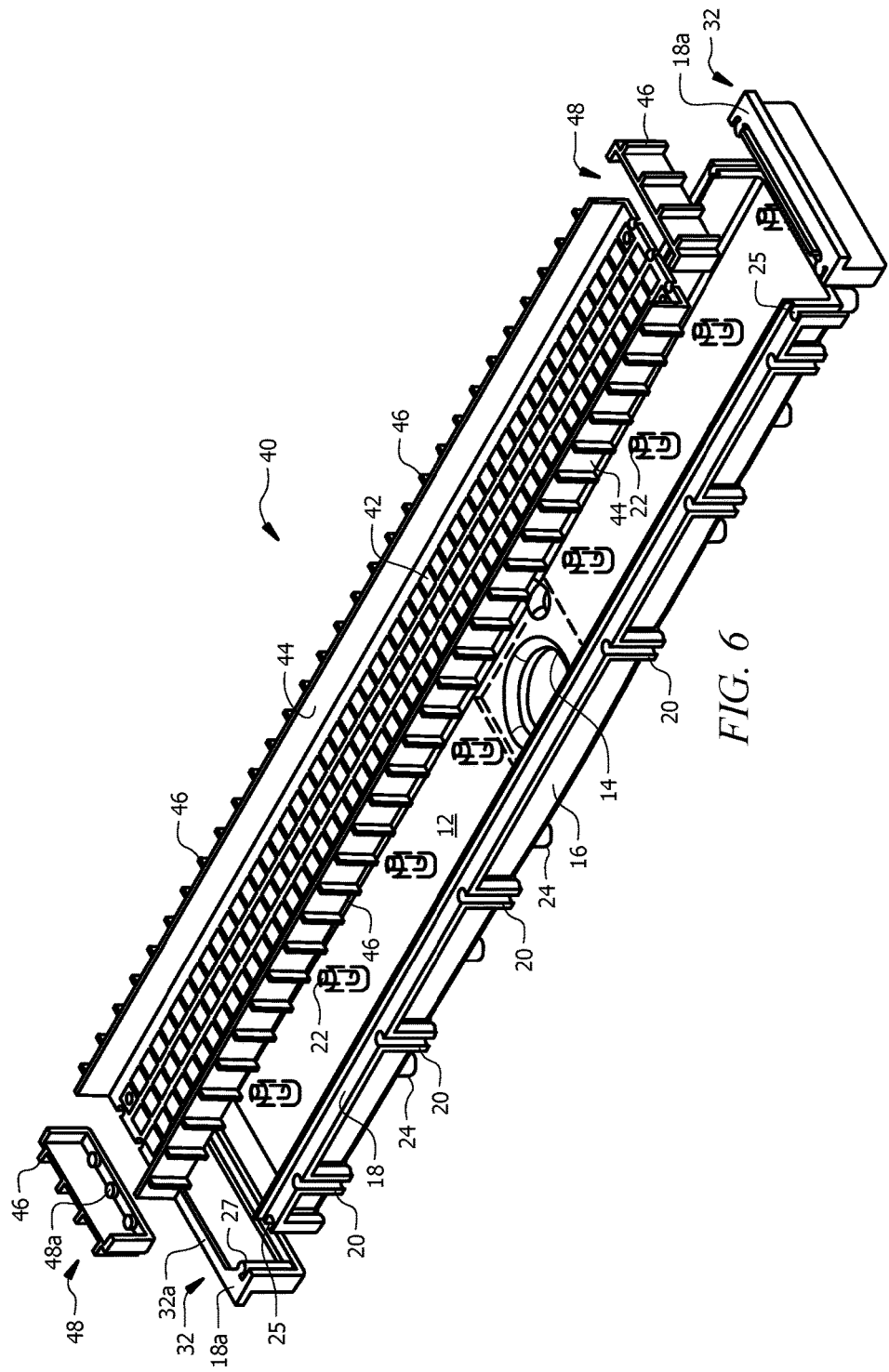
FIG. 6 is a fully exploded top perspective view of a drain body that is not extended.

FIG. 6 is an exploded view of a drain body 10 having no extension members 30. Accordingly, its opposite ends are closed by end walls 32, 32. This view adds end walls 48, 48 that close the ends of insert 40. Although multiple fastening means are within the scope of this invention, in this embodiment a plurality of upstanding truncate protrusions, collectively denoted 48a at the left end of FIG. 6, are formed in a bottom wall of each end wall 48 and said truncate protrusions engage mating openings 48b formed in bottom wall 42 of insert 40 as depicted at the right end of FIG. 6.

Figure 7:
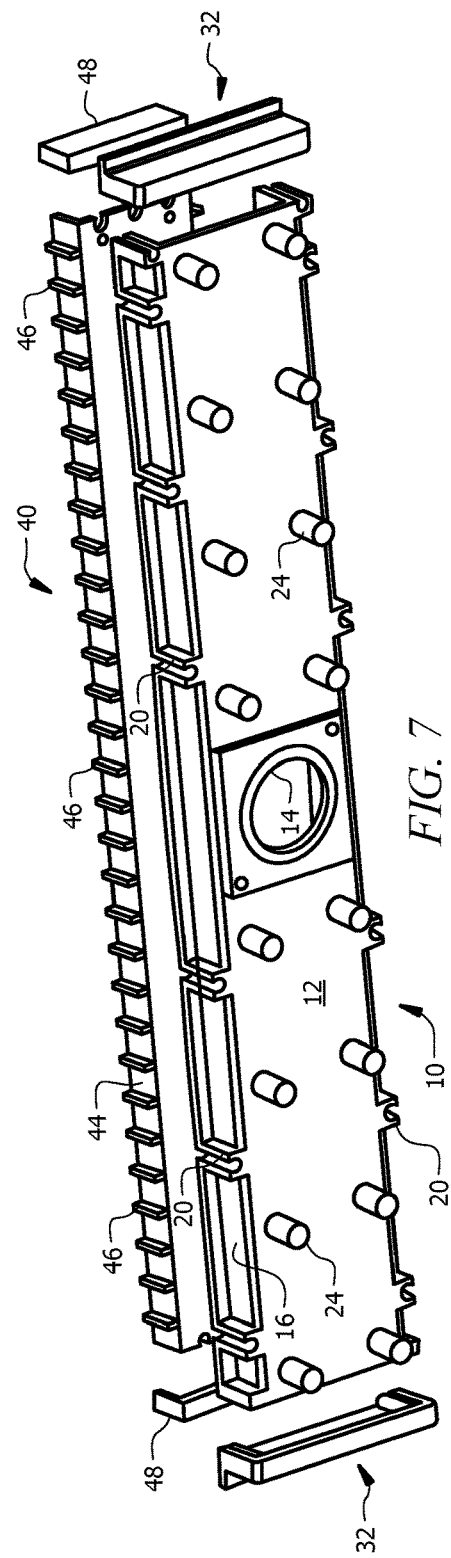
FIG. 7 is a fully exploded bottom perspective view of a drain body that is not extended.

The parts depicted in the top perspective view of FIG. 6 are depicted in FIG. 7 as well from a bottom perspective view.

Figure 8:
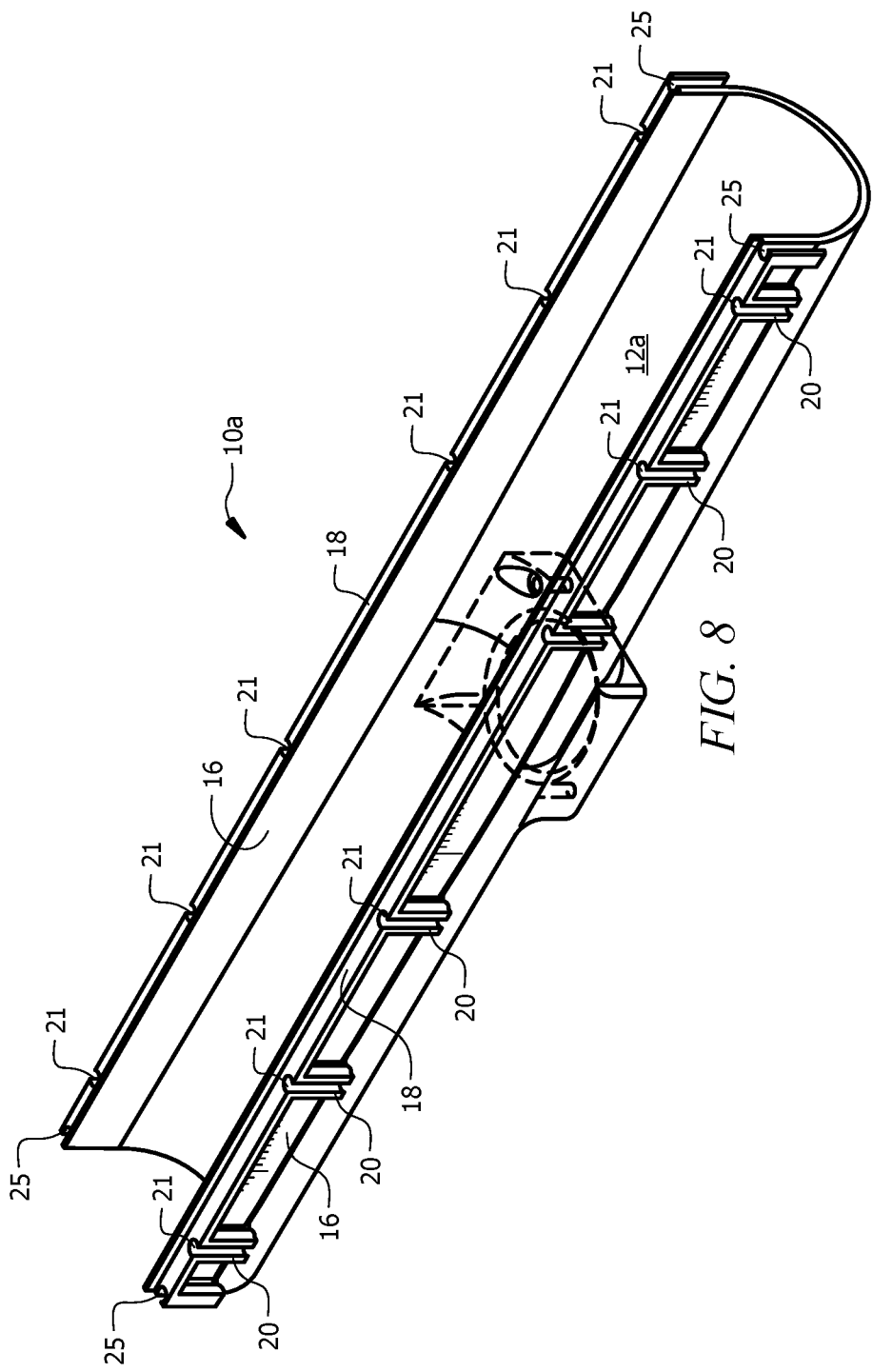
FIG. 8 is a perspective view of a drain body having a semi-circular cross-sectional shape.

FIG. 8 depicts drain body 10a having channel 12a that is semi-circular in transverse section instead of the rectangular channel of drain body 10. This embodiment also requires semi-circular extension members and semi-circular inserts but in all other respects is formed in substantially the same way as drain body 10 and performs the same function. As suggested by FIG. 8, the transverse cross-section of the channel is not limited to a rectangular or semi-circular configuration but may be provided in many other arcuate, curvilinear, or multifaceted functional shapes.

Although the preferred embodiment of novel linear drain 10 or 10a includes integrally formed mounting members 20, the scope of this invention also includes separately formed mounting members, not depicted, that are clipped onto or otherwise attached to novel drain body 10 or 10a or to extension members 30. Such independently formed members can also be attached to a conventional linear drain so that the float sticks of the incorporated patent may be used to facilitate installation.

Novel linear drain 10 or 10a is preferably formed of acrylonitrile butadiene styrene (ABS) or any other light-inweight, durable material that may be cut to length as needed for differing installation dimensions, thereby obviating the need to stockpile metallic linear drains of many differing lengths.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A linear drain for a shower floor, comprising:
   An elongate, channel-shaped drain base having a longitudinal axis and a predetermined depth;
   said drain base including a bottom wall;
   a drain water-receiving aperture formed in said bottom wall;
   a pair of drain base side walls in mechanical communication with said bottom wall on longitudinally-extending opposite sides thereof;
   a pair of drain base end walls on opposite ends of said drain base, said end walls being transversely disposed relative to said longitudinal axis;
   a first plurality of float stick mounting members secured to a first side wall of said pair of drain base side walls;
   a second plurality of float stick mounting members secured to a second side wall of said pair of drain base side walls;
   each of said mounting members adapted to engage a leading end of a float stick;
   whereby said apparatus facilitates installation of an elongate linear drain in a shower.

2. The linear drain of claim 1, further comprising:
   an insert releasably received within said drain base;
   said insert having a longitudinal extent substantially equal to a longitudinal extent of said drain base, a transverse extent less than a transverse extent of said drain base and including longitudinally extending side walls having a height extent substantially equal to a height extent of said side walls of said drain base;
   a plurality of spacers formed integrally with said insert, said plurality of spacers positioning said insert relative to said drain base so that said insert and said drain base share a common longitudinal axis and so that a longitudinally-extending space is provided between said insert and said drain base on both longitudinally-extending sides of said insert.

3. The linear drain of claim 1, further comprising:
   a pair of drain base end walls of said common height releasably connected to opposite ends of said drain base, said end walls being transversely disposed relative to said longitudinal axis of symmetry.

4. The apparatus of claim 1, further comprising:
   each of said mounting members being integrally formed with their associated side walls.

5. The apparatus of claim 1, further comprising:
   each of said mounting members being independently formed and being temporarily attachable to the one or more sidewalls, thereby providing an installer with the ability to adjust float stick mounting member locations as needed during the installation process.

6. The apparatus of claim 1, further comprising:
   a plurality of openings formed in said bottom wall of said drain base;
   a screw disposed in screw-threaded engagement with each of said openings;
   each of said screws having a position of repose where a leading end of each screw is flush with an upper surface of said drain base bottom wall;
   each of said screws having an advanced position where a leading end of each screw is raised with respect to said upper surface;
   whereby said insert is raised with respect to said bottom wall of said drain base when said screws are advanced so that tile that overlies a shower floor is flush with tile that overlies the bottom wall of said insert.

7. The apparatus of claim 1, further comprising:
   at least one extension member having a structure similar to said drain base;
   said at least one extension member having a first open end that is releasably connectable to an open end of said drain body;
   said at least one extension member having a second end closed by an end wall that is transversely disposed relative to the longitudinal axis of said drain body;
   whereby an effective length of said drain body is increased by connecting said at least on extension member to said drain body.

8. The apparatus of claim 7, further comprising:
   an insert releasably received within said extension member;
   said insert having a structure similar to the structure of said insert releasably received within said drain base.

9. The apparatus of claim 1, further comprising:
   said bottom wall being sloped towards said water-receiving aperture.

10. The apparatus of claim 1, further comprising:
    said bottom wall having a semi-circular configuration in transverse section.

11. A method of installing a drain in a shower, comprising the steps of:
    providing a drain body, the drain body having one or more sidewalls;
    forming a plurality of mounting members along an outboard side of each sidewall of the drain body;
    providing a plurality of float sticks, wherein each float stick is adapted to engage one of said mounting members and each float stick that reduces in height along its longitudinal extent; and
    securing one or more float sticks to one or more mounting members adapted to be engaged by a float stick to facilitate sloping of a floor that leads to said drain liner.

12. The method of claim 11, further comprising the steps of:
    providing at least one extension that is connectable to drain body;
    providing a first elongate insert that is nested within the drain body;
    providing at least a second elongate insert that is nested within said at least one extension;
    providing end walls for closing a preselected portion of the drain body and a preselected portion of said at least one extension; and
    forming a plurality of mounting members along an outboard side of said at least one extension.

13. The method of claim 12, further comprising the steps of:
    providing a plurality of height adjustment screws in respective bottom walls of the drain body and said at least one extension to enable height adjustment of the inserts so that tile that overlies the shower floor is flush with tile that overlies the insert.

14. A drain for a shower floor, comprising:
    a drain base having a predetermined depth;
    said drain base including a bottom wall;

a drain water-receiving aperture formed in said bottom wall;

one or more drain base side walls in mechanical communication with said bottom wall;

a plurality of float stick mounting members secured to an outboard side of the one or more drain base side walls;

each of said mounting members adapted to engage a leading end of a float stick; and whereby said apparatus facilitates installation of a drain in a shower.

15. The linear drain of claim 14, further comprising:

an insert releasably received within said drain base;

said insert having a longitudinal extent substantially equal to a longitudinal extent of said drain base, a transverse extent less than a transverse extent of said drain base and including longitudinally extending side walls having a height extent substantially equal to a height extent of said side walls of said drain base; and a plurality of spacers formed integrally with said insert, said plurality of spacers positioning said insert relative to said drain base so that said insert and said drain base share a common longitudinal axis and so that a longitudinally-extending space is provided between said insert and said drain base on both longitudinally-extending sides of said insert.

16. The linear drain of claim 14, further comprising:

a pair of drain base end walls of said common height releasably connected to opposite ends of said drain base, said end walls being transversely disposed relative to said longitudinal axis of symmetry.

17. The apparatus of claim 14, further comprising:

each of said mounting members being integrally formed with their associated side walls.

18. The apparatus of claim 14, further comprising:

each of said mounting members being independently formed; and attachment means for securing each mounting member to a side wall of said drain base at a preselected location on said side wall.

19. The apparatus of claim 14, further comprising:

a plurality of openings formed in said bottom wall of said drain base;

a screw disposed in screw-threaded engagement with each of said openings;

each of said screws having a position of repose where a leading end of each screw is flush with an upper surface of said drain base bottom wall;

each of said screws having an advanced position where a leading end of each screw is raised with respect to said upper surface;

whereby said insert is raised with respect to said bottom wall of said drain base when said screws are advanced so that tile that overlies a shower floor is flush with tile that overlies the bottom wall of said insert.

20. The apparatus of claim 14, further comprising:

at least one extension member having a structure similar to said drain base;

said at least one extension member having a first open end that is releasably connectable to an open end of said drain body;

said at least one extension member having a second end closed by an end wall that is transversely disposed relative to the longitudinal axis of said drain body;

whereby an effective length of said drain body is increased by connecting said at least on extension member to said drain body.

\* \* \* \* \*